Jan. 15, 1957 H. A. AMMAN 2,777,215
RADAR TRAINING DEVICES
Filed April 6, 1953 5 Sheets-Sheet 1

INVENTOR.
Hubert A. Amman
BY
ATTORNEY.

Jan. 15, 1957  H. A. AMMAN  2,777,215
RADAR TRAINING DEVICES
Filed April 6, 1953  5 Sheets-Sheet 2

INVENTOR.
Hubert A. Amman
BY
ATTORNEY.

Jan. 15, 1957  H. A. AMMAN  2,777,215
RADAR TRAINING DEVICES

Filed April 6, 1953  5 Sheets-Sheet 4

INVENTOR.
Hubert A. Amman
BY
ATTORNEY.

Jan. 15, 1957  H. A. AMMAN  2,777,215
RADAR TRAINING DEVICES
Filed April 6, 1953  5 Sheets-Sheet 5

INVENTOR.
Hubert A. Amman
BY
ATTORNEY.

_United States Patent Office_

2,777,215
Patented Jan. 15, 1957

2,777,215

RADAR TRAINING DEVICES

Hubert A. Amman, Pueblo, Colo.

Application April 6, 1953, Serial No. 346,863

11 Claims. (Cl. 35—10.4)

This invention relates to apparatus for the training of personnel in the use of radio detection and ranging equipment as applied to aircraft and marine service.

This is a continuation-in-part of my co-pending application, Serial No. 145,135, filed February 20, 1950, which issued into United States Letters Patent No. 2,633,648 on April 7, 1953. In my copending application there is presented and claimed a training device of the character forming the subject matter hereof, adapted particularly for use in teaching a student azimuth-elevation (Az-El) presentation produced by the radar sweep circuit. Accordingly, all of the broad primary objects set forth in said application are applicable equally to the present invention except only that the trainer hereof is adapted particularly for teaching surveillance or plan position indicator (P. P. I.) presentations.

An additional object of the present invention is to provide a training device differing in one respect from the azimuth-elevation type of trainer of my co-pending application in that the range lines, ground clutter and the like, are projected through a half silvered mirror, whereas the target or targets are reflected to the observer on the opposite side of the mirror, all for the purpose of simulating P. P. I. presentations by superimposing the various markings on the mirror or viewing panel.

Still another object hereof is to provide a surveillance trainer wherein the target or targets take the form of an elongated pip, there being included structure capable of simulating the cathode ray tube screen presentation by producing the appearance of a number of juxtaposed images of varying degrees of decay and to include means as a part thereof for permitting adjustment of the rate of decay whereby the actual operating conditions of radar may be closely duplicated.

Additional objects, as in my aforesaid application, relate to important structural arrangements and parts for producing artificial presentations, all simulating closely radar scope presentations, to the end that the trainer will effectively teach the student how to read and how to operate radar equipment of all kinds.

These and many additional objects may be more readily understood upon perusal of the following specification, reference being had to the accompanying drawings, wherein.

Figure 1:
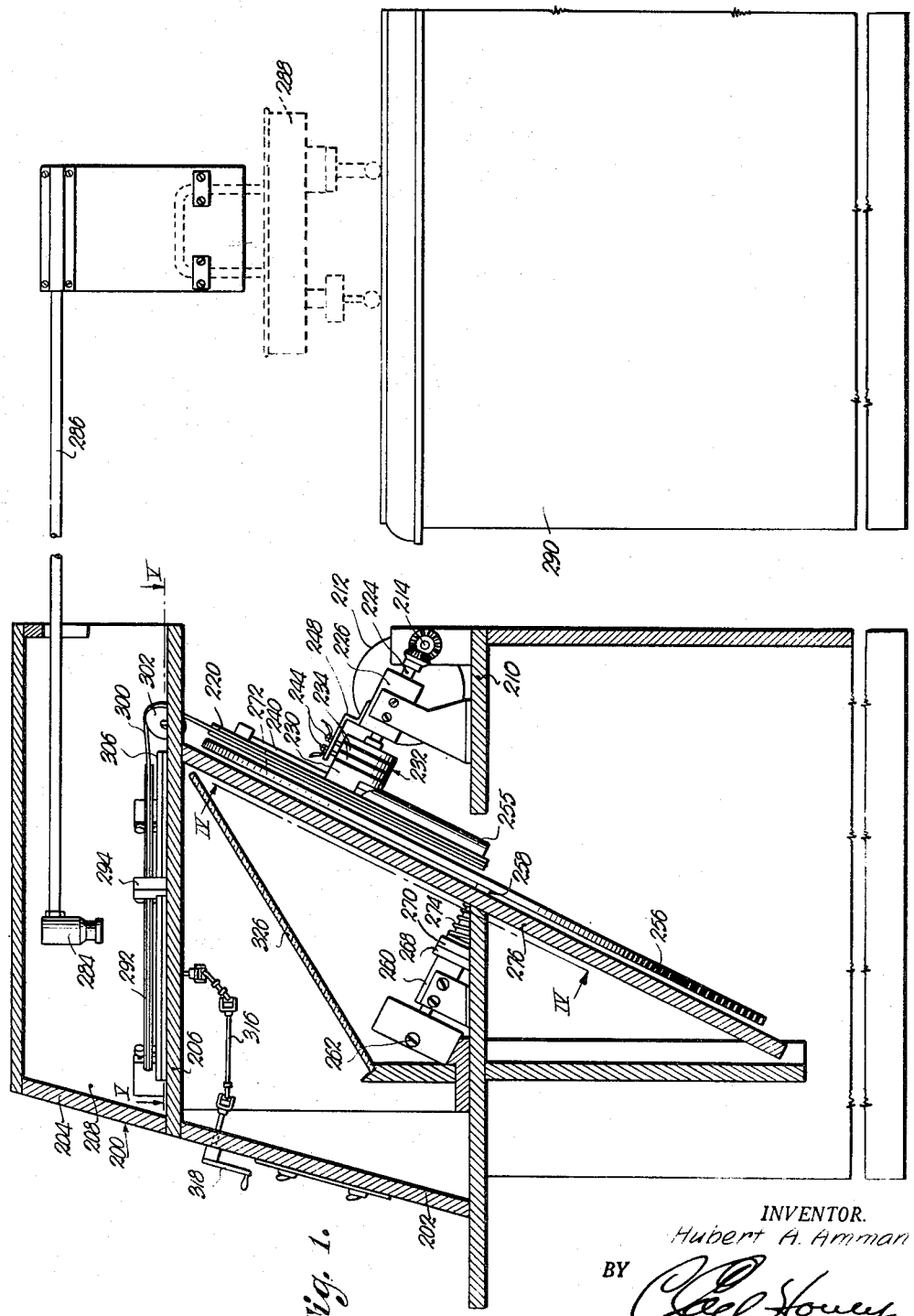
Figure 1 is a substantially central, vertical, cross-sectional view showing a radar training device made in accordance with the present invention.

Surveillance or plan position indicator (P. P. I.) presentation is simulated through use of the trainer shown in Figs. 1 to 10 inclusive. A cabinet 200 (Figs. 1–3) has an inclined front wall 202 that includes a lid 204 hingedly mounted on a horizontal wall 206, forming a chamber 208.

An electric motor 212 is mounted on a horizontal partition 210 and a shaft 214 driven by motor 212 rotates an opaque, inclined scanning plate 220 through a shaft 224 fixed to a hub 232. A bearing 226 for shaft 224 is affixed to partition 210 and the bottom face of plate 220 is mounted directly on spaced legs 230 of the hub 232. (See also Fig. 7.)

Electrical slip rings 234 on hub 232 are coupled with an elongated black light or ultraviolet ray lamp 240 passing between legs 230 of hub 232 and secured to the bottom face of plate 220. Accordingly, plate 220, lamp 240, hub 232, shaft 224 and rings 234, rotate together as a unit when motor 212 is energized. Electrical brushes 244 slidably engage the slip rings 234 to complete the circuit and are held biased thereagainst by a resilient bracket 248 on bearing 226.

Figure 3:
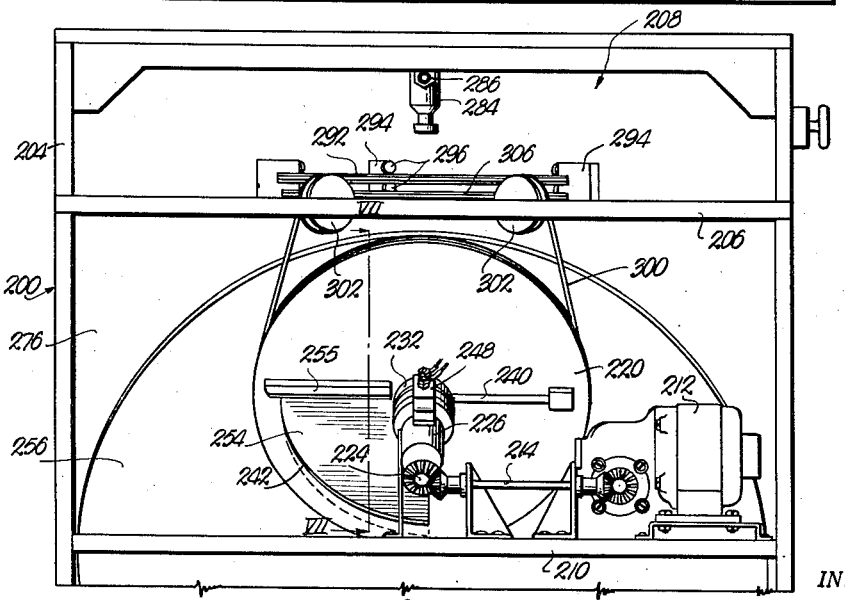
Fig. 3 is a fragmentary, rear elevational view thereof.
Figure 4:
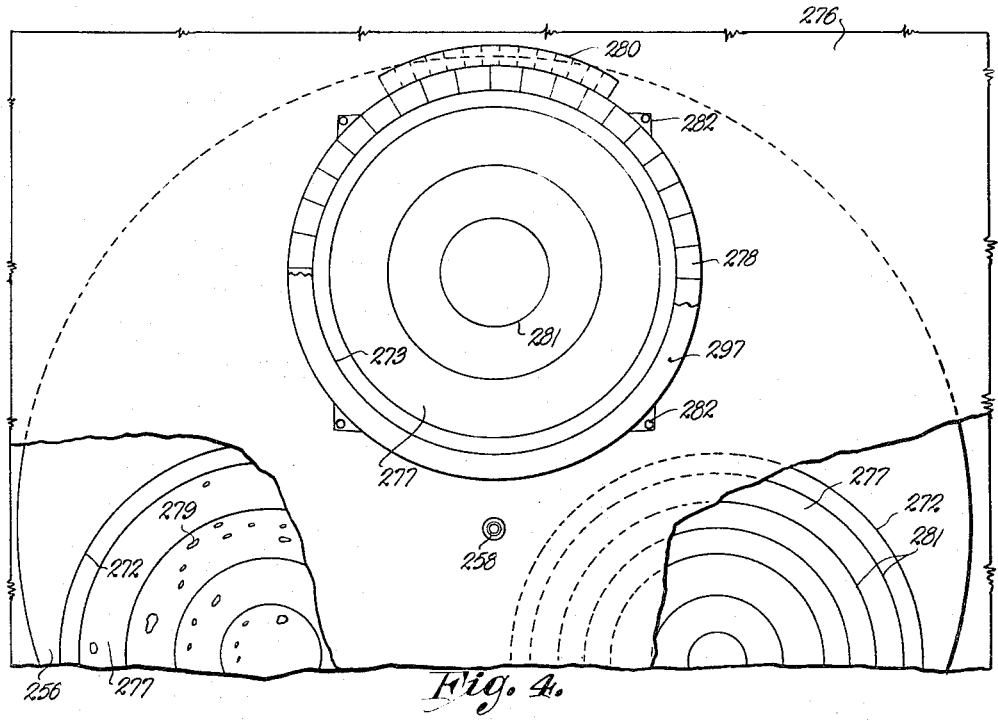
Fig. 4 is a fragmentary, cross-sectional view taken on line IV—IV of Fig. 1, parts being broken away to reveal details of construction.
Figure 7:
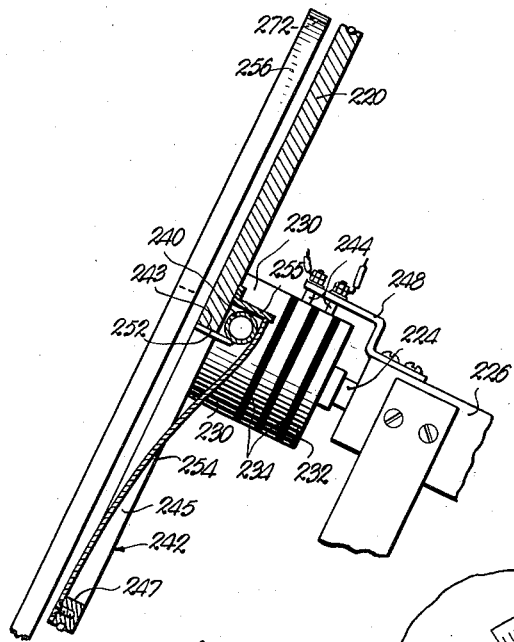
Fig. 7 is a cross-sectional view taken on line VII—VII of Fig. 3.

Circular plate 220 is provided with a sector-shaped aperture 242 defined by a radial edge 243 parallel with lamp 240, a second radial edge 245 perpendicular to edge 243 and an interconnecting arcuate edge 247 concentric with the periphery of plate 220. (Figs. 3 and 7.) An elongated, luminescent strip 252 of plastic or the like is affixed to edge 243 and extends outwardly from aperture 242 into partial overlapping relationship to lamp 240. For purposes hereinafter made clear, strip 252 absorbs radiations from lamp 240 and produces a visible light.

An opaque deflector panel 254, having the peripheral configuration of aperture 242, has its curved edge secured to the uppermost face of plate 220 along the edge 247 of aperture 242. Panel 254 extends through aperture 242 and is curved over lamp 240 on one side of hub 232. An opaque strip 255 on the bottom face of plate 220 closes panel 254 in opposed relationship to strip 252 and parallel with the latter.

A circular holder 256 parallel with plate 220 and spaced from the upper face thereof, has three circular openings 272 therein having their axes in a pattern concentric with the axis of holder 256. (Figs. 1, 3, 4 and 7). Each opening 272, respectively, is provided with a circular range presentation screen 277 in the form of a disc of translucent material having patterns thereon representing ground clutter, obstructions and the like 279, together with range lines 281. Screens 277 may vary to present differing simulated areas of use, scope of coverage, etc., and are removably mounted in openings 272 in any suitable manner to permit ready changing as desired. The aforesaid patterns 279 and 281 are formed by use of phosphorescent and fluorescent paint on one face of discs 277. Holder 256 is mounted on one end of a shaft 258 passing through a wall 276 that is parallel with and spaced above holder 256.

Figure 2:
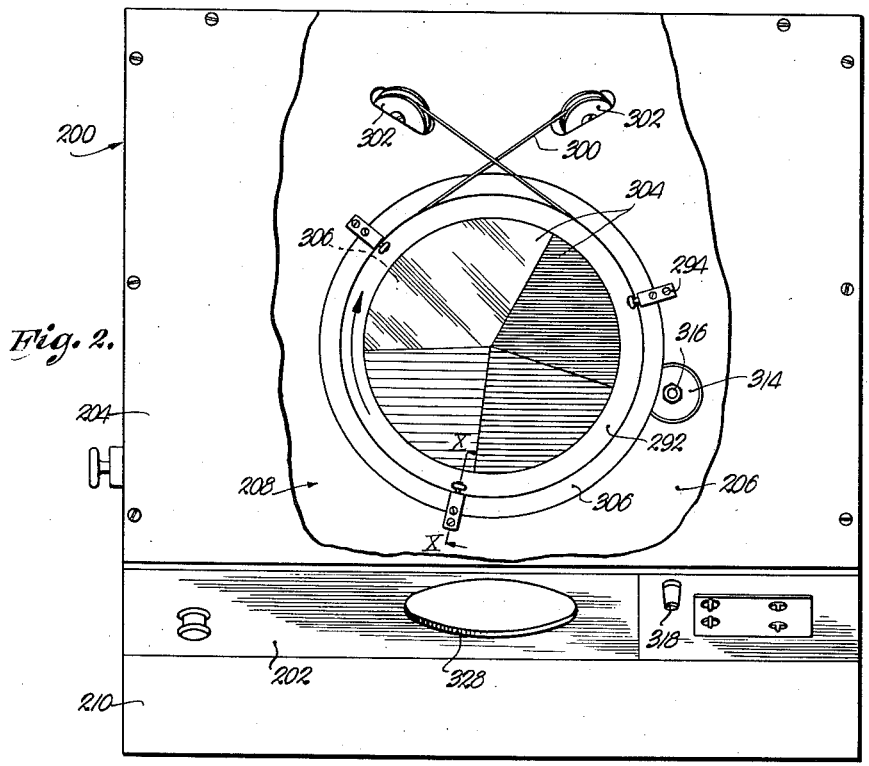
Fig. 2 is a top plan view thereof, parts being broken away for clearness.

Shaft 258 rotates in a bearing 260 secured to partition 210 and is driven through crank 262 coupling with shaft 258 in gear box 266 (Fig. 1). Discs 268 and 270 on bearing 260 and shaft 258 respectively have interlocking teeth on the proximal faces thereof, disc 270 being slidable but non-rotatable on shaft 258. A spring 274 coiled on shaft 258 is interposed between wall 276 and disc 270 to yieldably hold discs 268 and 270 together.

Thus, by turning crank 262, any one of the openings 272 can be positioned in coaxial alignment with plate 220 and with a hole 273 in wall 276.

An annular groove 297 surrounding hole 273 (Figs. 4, 8 and 9), rotatably receives a navigating head ring 278 and a stationary declination indicating arc 280 is embedded within wall 276. Ring 278 may be adjusted with respect to arc 280 to the position that will allow the reading thereof to include the magnetic compass deviation from true north at the particular location where the instrument is placed in use. Both arc 280 and ring 278 are formed from transparent material and calibrated with transverse score lines that are in turn lighted by a number of lamps 282 embedded within wall 276. Lamps 282 are disposed to direct rays of light radially into ring 278. Any suitable means (not shown) may be provided to releasably hold ring 278 in a set position with respect to arc 280.

A lamp unit 284 (Figs. 1 and 3) located in compartment 208 and carried by conduit 286 contains a lamp and lens assembly of conventional character which directs a concentrated beam of light of small diameter in a downward direction, said lamp being energized from a low voltage power supply or a small dry battery (not shown).

A Link Trainer crab 288 (Fig. 1) carries conduit 286 for imparting motion to lamp unit 284 coincident with the movement of crab 288 on Link Trainer desk 290.

A target light intensity control scanner disc 292 (Figs. 1, 2, 3 and 10) is disposed for rotation within a plurality of brackets 294 each having a pair of opposed guide rollers 296 and a roller 298 for the periphery of disc 292 that allow scanner 292 to rotate in a smooth manner with a minimum of friction. A groove in the periphery of scanner disc 292 receives a belt 300 which passes over pulleys 302, mounted in partition 206, and engages a similar groove in scanner plate 220. The diameters of scanner disc 292 and scanner plate 220 are equal, allowing the maintenance of synchronization. The circular scanner disc 292 has a number of segmental areas 304 (Fig. 2) of varying degrees of translucency with the result that as the scanner disc 292 rotates, the amount of light emanating from lamp unit 284 thereabove that passes through disc 292 is gradually reduced to a minimum and instantaneously increased to a maximum. In other words, one of the areas 304 is fully or at least substantially transparent with adjacent areas 304 progressively decreasing in transparency counter to the direction of rotation of disc 292. Areas 304 may be produced in any suitable manner such as painted coatings, thin sheets of material glued to disc 292, or use of separate segments interconnected to form disc 292.

A clear plastic plate 306 is located below the scanner disc 292 and spaced therefrom and has a coating of phosphorescent and fluorescent paint on its upper surface, the light from the lamp unit 284 above energizing the paint and causing it to glow.

A transparent, circular tracking grid plate 308 (Figs. 5, 6 and 10) is mounted flush with the top of partition 206 immediately beneath plate 306 and spaced therefrom and has parallel tracking range lines 310 and transverse range marks 311, scored in the upper surface thereof. Plate 308 is rotated by a cable 312 which engages a groove in the periphery of said plate 308 and is driven by a sheave 314 affixed to a flexible shaft 316 extending through the wall 202 where it terminates in a crank 318. Rollers 320 position the plate 308 and hold the same for rotation about its center.

Figure 5:
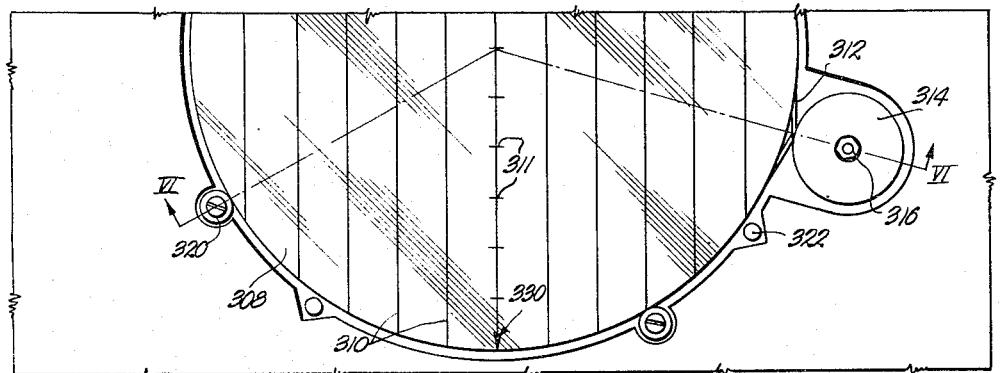
Fig. 5 is a fragmentary, cross-sectional view taken on line V—V of Fig. 1.
Figure 6:
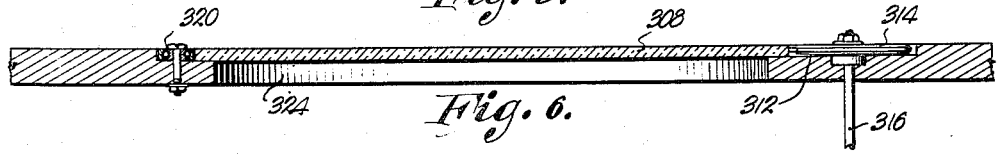
Fig. 6 is a cross-sectional view taken on line VI—VI of Fig. 5.

Lamps 322 submerged in wall 206 as shown in Fig. 5, illuminate the scored lines 310 and 311, the illumination of lamps 282 and 322 being regulated at will by operation of rheostats (not shown).

The image coming from the assembly just described and within compartment 208 passes through an opening 324 in partition 206 and falls on a half-silvered mirror 326 which is disposed between partition 206 and wall 276 at substantially equal angles with each and is reflected through an opening 328 in wall 202 of the cabinet 200. In other words, miror 326 bisects the acute angle defined by walls 206 and 276. The image from one of the range presentation screens 277 passes through the half silvered mirror 326 to the opening 328 and thus the two images appear to be merged in the simulated representation.

In operation, with energy provided to motor 212, scanner plate 220 rotates at a preferable speed of approximately 30 revolutions per minute and scanner disc 292, being driven by belt 300, rotates at the same speed and in synchronization with disc 220. The beam of light from lamp unit 284 moves about on the upper scanning disc 292 as positioned by the Link Trainer crab 288 and energizes a spot on the coated surface of the plate 306 which produces a spot of light that travels through the tracking grid plate 308 and is reflected by the mirror 326 to the observer. The tracking grid plate 308 may be rotated to align any one of the parallel lines 310 with the direction of travel, whereupon the magnetic heading of the simulated target may be determined by reading the azimuth at the point designated by an arrow 330. The lighting for the lines 310 and 311 may be varied or turned off as desired by the trainee for optimum results.

The holder 256 is positioned as desired to place one of the three available screens 277 in register with the rear scanning plate 220. The black light source 240 on the scanner plate 220 energizes the luminescent coatings of the range patterns 279 and 281 of screen 277 in a manner simulating the scanning beam of an actual radar scope wherein the brilliance of a spot on the screen increases instantaneously and decays until it is substantially 50% of the original brilliance.

The navigation ring 278 surrounding the range pattern is positioned to adjust the directional indication to that required by the deviation of the magnetic north from true north at the particular geographic location being simulated by the range pattern. A reading made at the point of the arrow 330 on the center line 310 of the tracking grids 311 with direction of target travel will be the magnetic heading of the target being followed. Control of the lighting to the navigation ring 278 is available for reducing the intensity or darkening the same entirely.

Figure 11:
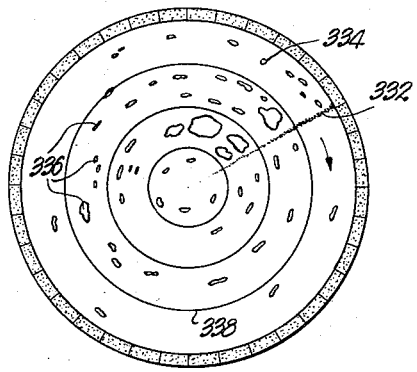
Fig. 11 is a plan view of a presentation made possible through use of the trainer shown by Figs. 1 to 10 inclusive.
Figure 10:
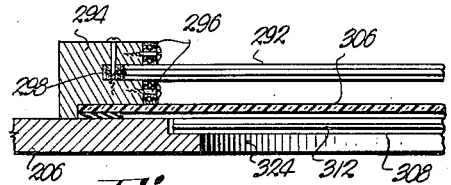
Fig. 10 is a fragmentary, cross-sectional view taken on line X—X of Fig. 2.

The patterns from both assemblies appear to merge by virtue of the half silvered mirror 326 wherein one image is reflected by and the other passes through mirror 326. Thus, a radar scope range presentation is simulated with a moving target or targets as desired which may be introduced or controlled as required by the training program on a presentation ground which may be selected and changed at will. In Fig. 11 a representation is shown as it appears to the observer in which a line 332 is produced by the light from the luminescent strip 252 on the rear scanner 220. A target 334 results from the energization of the luminescent material on plate 306 by the light from lamp unit 284 and moves as determined by the external positioning means 288. The stationary patterns 336 and 338 representing ground clutter and range lines respectively are selected and introduced into the image by energizing one of the luminescent screens 277 with ultraviolet light carefully controlled and scanned to produce the changes in intensity for a true simulation of the radar scope representation.

Figure 12:
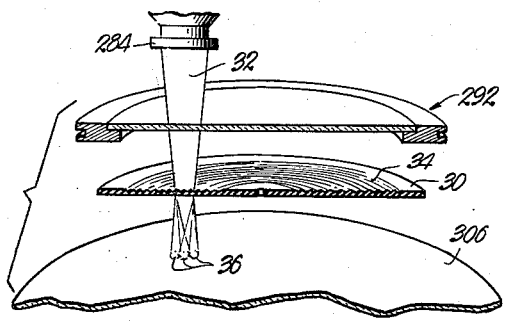
Fig. 12 is a fragmentary, stretched-out, perspective view showing diagrammatically a modified form of the invention wherein means is provided for elongating the target light.

In the modification of the invention just described and illustrated by Figs. 1 to 11 inclusive, the light beam projected by lamp 284, forms the small circular spot of light or target 334 on the plate 306 and for some purposes such presentation is satisfactory even if an incandescent lamp 284 is employed. It is to be preferred however, that the moving target or targets of the surveillance trainer take the form of an elongated pip as it is projected on the phosphorescent coated plate 306 by lamp 284. The round spot of light 334 may be elongated as shown in Fig. 12 of the drawings if a transparent phonograph record 30 is placed between the rotating scanning plate 292 and the plate 306 within the path of light beam 32 emanating from lamp 284. The scribed indentations 34 of the record 30, produce a prismatic effect which refracts the light beam 32 into a plurality of at least three spots 36 on the plate 306 that have the appearance of an elongated pip.

Manifestly, any number of lamps 284 may be used to produce a number of targets on the plate 305 and accordingly on the viewing panel 326, and it is to be preferred that lamp 284 be of the ultraviolet type. If a record such as at 30, is used as shown in Fig. 12 of the drawings, suitable means may be provided (not shown) for raising and lowering the record 30 since, as it is lowered, the elongation of the pip 36 is reduced but the same becomes more brilliant.

In order to provide for targets similar to the pip 36 but concentric with the center of plate 306 at all times regardless of the movement of the lamp or lamps 284 over the area covered, it is necessary to utilize a refractor in which the finely scored lines such as at 34, are more nearly parallel with the radii of plates 292 and 306. This is satisfactorily accomplished through utilization of the structure shown in Figs. 13 and 14 of the drawings. A scanning plate 38, similar to the plate 292, is provided with a pie-shaped, segmental opening 40 below which is mounted an element broadly designated by the numeral 42 shown in Figs. 13 and 14.

The first step in the production of the element 42 is to utilize a conventional belt-type voice recorder (not shown) to score a belt-type record that is made from thin, clear plastic. After the plastic belt is so scored it is cut into a rectangular panel 44 shown in Fig. 15 and illustrating the longitudinal score lines 46. The panel 44 is thereupon cut diagonally as shown by dotted lines 48 and 50, presenting segments 52, 54, 56 and 58. The segments 52 and 54 are discarded and through use of the same procedure, a third segment such as at 56 or 58, is produced, such third segment being designated in Fig. 16 by the numeral 60.

Figures 15, 16:
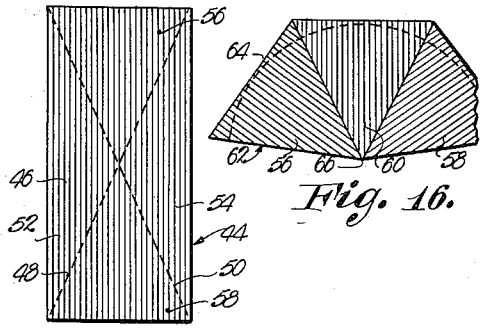
Fig. 15 is a plan view of a panel used in producing the modification of Figs. 13 and 14.
Fig. 16 is a plan view illustrating the second step of producing the modification of Figs. 13 and 14.
Figure 13:
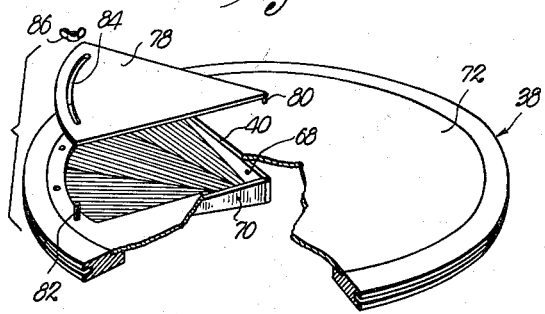
Fig. 13 is a fragmentary, stretched-out, perspective view of a modified form of the invention showing the manner of presenting a plurality of elongated, juxtaposed pips concentric with the axis of rotation of the target light scanning plate and means to produce decay or fade.
Figure 14:
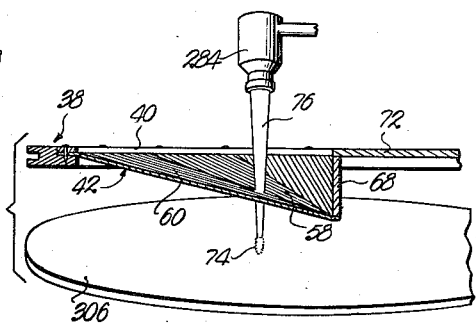
Fig. 14 is a stretched-out, perspective view of the modification shown in Fig. 13 showing the scanner plate in section.

The three segments 56, 58 and 60 are arranged as shown in Fig. 16 and their edges glued together, whereupon the member 62 so produced, is cut along arcuate line 64 to produce the element 42. It is seen that the score lines 46 in the element 42, all radiate from a common center point 66 that is coincident with the axis of rotation of the plate 38 when the element 42 is mounted on the plate 38. Element 42 is secured to the plate 38 directly beneath the opening 40 and through use of opaque, triangular walls 68 and 70, the element 42 is held in an inclined position as shown in Figs. 13 and 14, sloping downwardly and inwardly toward an imaginary line depending from the axis of rotation of the plate 38. The scanning plate 38 differs further from the plate 292 previously described, in that its disc portion 72 is opaque.

It is recalled that a simulated decay of the moving target or pip was produced through use of the scanning disc 292 by the provision of the segmental areas 304 of varying degrees of translucency. These areas are periodically illuminated with each revolution or sweep of the scanner.

By use of ultraviolet light from lamp 284, similar results are produced through use of the modified form of scanner 38 in that the spot of light or target 74 on plate 306, is energized by the ultraviolet light during each quarter revolution of scanner 38 when the scored section of conically-shaped plastic element 42 passes beneath the lamp 284 as shown in Fig. 14 intercepting the beam of light 76 emanating therefrom. As soon as the opaque portion 72 of the scanner 38 intercepts the ultraviolet beam 76 to cut off the flow of light to the plate 306, the target image 74 will not abruptly disappear, but will gradually fade or decay because of the persistence or ability of the phosphor coat on the plate 306 to retain the energy imparted by the ultraviolet ray 76.

The persistence or rate of decay of the energized phosphor depends upon the type of phosphorescent material utilized, and the duration of activation by the ultraviolet lamp 284. Such duration control is accomplished in the trainer by the provision of an opaque, pie-shaped section 78, mounted on the disc 72 above the opening 40 for adjustment by the instructor. Section 78 has a pin 80 at its apex for swingably mounting the section 78 upon the disc 72 and a threaded stud 82 on the disc 72 extends through an arcuate slot 84 in the segment 78. A wing nut 86 on the stud 82, holds the segment 78 in pre-selected positions relative to the opening 40.

Since the scored lines 46 are substantially parallel with the radii of plate 72 and plate 306, the elongated pips 74 will always be substantially concentric with the axis of plate 306, regardless of the point on the member 42 where the rays of ultraviolet light 76 penetrate the same. Furthermore, as above indicated, when the rays of light 76 penetrate the member 42 adjacent point 66, the pip 74 will be shorter but more brilliant than the pip that is formed when the rays of light 76 pass through the member 42 adjacent the periphery of the disc 72. Furthermore, if a plurality of lamps 284 are used simultaneously, some of the pips will be relatively long and other pips will be shorter but more brilliant, depending of course, upon the relative positions of the lamps 284 utilized in the training process.

Radar equipment normally catches a moving target momentarily by a sweep of the rotating radar antenna, and the target therefore, appears as an elongated pip on the cathode tube or scope. It is for this reason that the modification shown in Figs. 13 and 14 is of value in producing a picture simulating that which will actually be seen by the student when he commences using radar equipment.

As the sweep continues around the scope at approximately 30 revolutions per minute, the reflecting body such as an aircraft, will have changed its position in space considerably. Thus, when it is again picked up by the rotating antenna, a new pip appears on the scope. Such new pip will either slightly overlap the previous pip or will be completely separated from it, depending upon the velocity of the reflecting body. Generally, and particularly with conventional aircraft, there is an overlap which occurs in such manner that older pips of varying degrees of fade or decay, cause the appearance of a "trail" aft of the new pip. Such "trail" may vary from a long definite configuration approximately one-half inch or more behind the target, or it may be barely perceptible.

Figure 17:
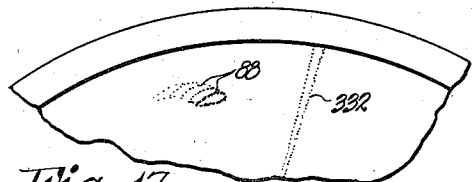
Fig. 17 is a fragmentary, plan view of the presentation produced through use of the structure shown in Figs. 13 and 14.

These appearances may be simulated through use of the modification shown in Figs. 13 and 14 as shown in Fig. 17 of the drawing, which is a fragmentary view of the actual picture seen on the viewing panel 326. The sweep 332 is shown in Fig. 17, as well as a plurality of pips 88 in juxtaposed relationship and of varying degrees of intensity as above explained.

Figure 18:
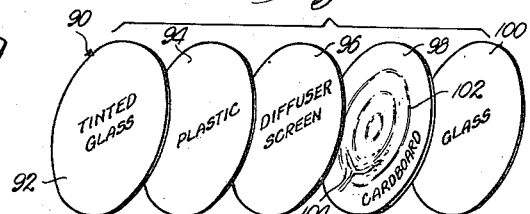
Fig. 18 is a stretched-out, perspective view of a modified form of range presentation screen.

In Fig. 18 of the drawings, there is illustrated a range presentation screen broadly designated by the numeral 90, which may be used in lieu of the screens 277 above set forth. Screens 277 preferably consisting of amber colored plastic discs, operate on the principle of excitation of the phosphor thereon. The range lines and ground clutter of a particular location, are painted on that face of the screens 277 opposite the observer with phosphorescent and/or fluorescent lacquer, and this substance is excited by the red-purple ultraviolet lamp 240 that is mounted on the rotating scanner disc 220. The observer sees only the visible light radiations of the energized prosphor and the luminescent plastic strip 252 on the rotating scanner 220. Such visible red-purple light, together with the invisible ultraviolet radiations of the fluorescent tube 240, are absorbed by the amber plastic which acts as a filter.

The modified form of screen 90 is made up of a number of initially separate sections 92, 94, 96, 98 and 100 stacked together in the sequence shown and interconnected in any suitable manner such as by the use of a tape at the periphery of the composite screen 90. Screen 90 is mounted in opening 72 of holder 256 in the same manner as in the case of discs 277, with the color section 92 facing the observer and with the clear section 100 facing the lamp 240.

Figure 19:
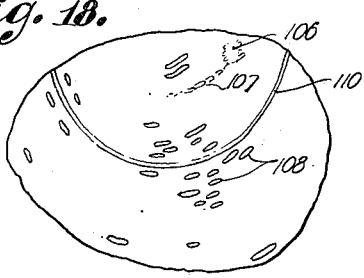
Fig. 19 is a fragmentary, plan view of the presentation produced through use of the screen shown in Fig. 18.

Sections 92 and 100 are preferably made from thin picture frame glass and the section 92 is tinted a proper color such as yellow or green and coated on that surface thereof facing section 94 with a phosphorescent material such as a powder, paint, lacquer or the like. Sections 94 consists of a thin, clear plastic spacer, Section 96 is a diffusor screen and may be made from such materials as translucent tissue paper. Sections 98 should be mask of relatively thin, semi-opaque cardboard or stencil-like fiber material. Range guide lines 102 and stationary targets, ground clutter and the like 104 representing a charted detail of a particular area, are cut-out as in a stencil in the mask 98. The picture produced on the view panel 326 by utilization of the range presentation screen 90, is depicted in Fig. 19 of the drawings. By proper stenciling of the mask 98, there can be presented bridges as at 106, a river dike 107, targets, buildings, ground clutter and the like 108 and range or guide lines 110.

Figure 20:
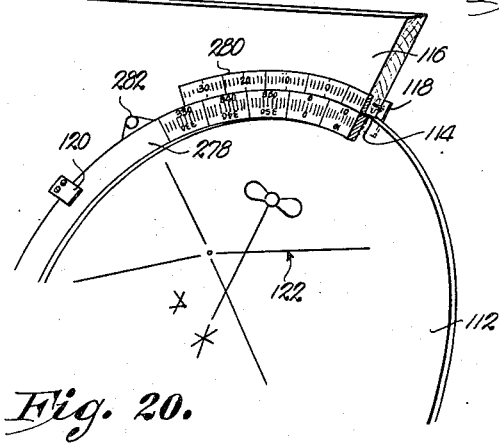
Fig. 20 is a fragmentary, perspective view of a modified form of the invention for producing a simulation of the transparent map used in connection with the surveillance radar scope and which is superimposed on the scope face.

A surveillance radar scope is rendered practicable for guiding pilots to within landing distance of a runway by use of a transparent map drawn to scale for the particular purpose and superimposed on the scope face. Provision for a similar map or "overlay" 112 is made in the modification shown by Fig. 20.

Figure 9:
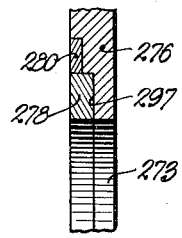
Fig. 9 is a cross-sectional view taken on line IX—IX of Fig. 8.
Figure 8:
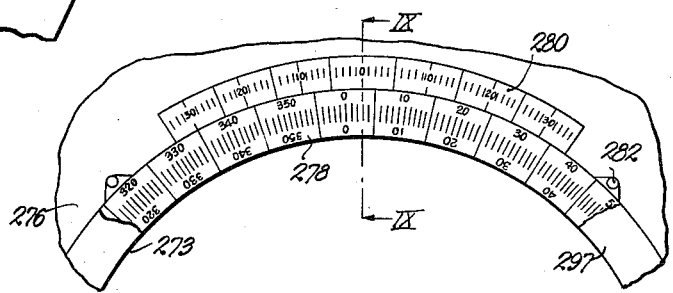
Fig. 8 is a fragmentary top plan view showing the navigating head ring assembly.

The overlay 112 is mounted within an opening 114 of wall 116 that is comparable to wall 276. The opening 114 is similar to the opening 273 but enlarged to the same outside diameter as groove 297, which is eliminated in the wall 116. A plurality of clips 118 on the wall 116, hold the overlay 112 within the opening 114. The declination indicating arc 280 is mounted on the wall 116 in the same manner as shown in Figs. 8 and 9, and navigating head ring 278 is superimposed upon the overlay 112, clips 120 being provided on the wall 116 to rotatably hold the ring 278 in place.

The map or overlap 112 is drawn to scale and provided with various markings broadly designated by the numeral 122, representative of approach control, antenna sites, airports, bridges, buildings, restricted areas and the like.

Having thus described the invention what is claimed as new and desired to be secured by Letters Patent is:

1. In a machine for training in the use of radio detection and ranging apparatus capable of producing cathode ray tube screen presentations, said machine comprising means for producing an elongated constant beam of light; a device for moving said beam of light along a predetermined path of travel; structure having a pattern thereon of luminescent material representing range lines, ground clutter and the like, said pattern being within the path of travel of said beam of light; mechanism for producing a concentrated constant beam of light separate from the first mentioned elongated beam of light and representing a target; means mounting said mechanism for movement through a predetermined path of travel; and a viewing panel within the path of travel of said elongated beam of light for picturing the elongated beam of light and said pattern, said panel having reflecting means thereon within the path of travel of said concentrated beam of light for depicting movement of said beams of light relative to each other and to the said pattern.

2. In a machine as set forth in claim 1 wherein said device comprises a rotatable scanning plate, and wherein said means for producing the elongated beam of light comprises a lamp mounted on the plate radially of its axis of rotation.

3. In a machine as set forth in claim 1 wherein said panel is translucent and disposed for passage of said elongated beam of light therethrough, the pattern being between the panel and said device.

4. In a machine as set forth in claim 1 wherein is provided constantly moving control means for continuously varying the intensity of the concentrated beam of light.

5. In a machine as set forth in claim 4 wherein said control means includes a rotatable scanner disc within the path of travel of the concentrated beam of light, and having a number of areas of varying degrees of translucency.

6. In a machine as set forth in claim 5 wherein said areas progressively increase in degree of translucency in one direction circumferentially around the axis of rotation of the scanner disc.

7. In a machine for training in the use of radio detection and ranging apparatus capable of producing cathode ray tube screen presentations, said machine comprising at least one movable target lamp; a movable scanning lamp; a viewing panel within the path of travel of rays of light emanating from said lamps; structure between the scanning lamp and said panel for superimposing a pattern upon the panel representative of range lines, ground clutter and the like; and means within the path of travel of the rays of light emanating from the target lamp for refracting the same into an elongated pip on the panel.

8. In a machine as set forth in claim 7 wherein the means for producing an elongated pip includes a member scored to maintain the pip concentric with a center point on the panel as the pip is moved on the panel in response to movement of the target lamp.

9. In a machine as set forth in claim 7 wherein said means for producing an elongated pip is provided with structure for continuously varying the intensity of the beam of light emanating from the target lamp as it impinges upon the panel.

10. In a machine as set forth in claim 7 wherein said means for producing an elongated pip includes structure for superimposing a series of juxtaposed, elongated pips upon the panel progressively fading or decaying in intensity as one end of the series of approached.

11. In a machine as set forth in claim 10 wherein said structure is provided with adjustable means for varying the persistence or rate of decay of the intensities of said pips on the panel.

References Cited in the file of this patent

UNITED STATES PATENTS

| | | |
|---|---|---|
| 2,016,151 | Levene | Oct. 1, 1935 |
| 2,443,631 | McDermott | June 22, 1948 |
| 2,470,912 | Best et al. | May 24, 1949 |
| 2,505,094 | Bunyan | Apr. 25, 1950 |
| 2,505,793 | Rust et al. | May 2, 1950 |
| 2,539,498 | Waller | Jan. 30, 1951 |
| 2,633,648 | Amman | Apr. 7, 1953 |